United States Patent
Zhang et al.

(10) Patent No.: US 12,486,459 B2
(45) Date of Patent: Dec. 2, 2025

(54) OPTIMIZATION METHOD FOR DIRECTIONAL PREPARATION TECHNIQUE AND EFFICIENT USE OF SEMI-COKE FOR BLAST FURNACE INJECTION

(71) Applicant: University of Science and Technology Beijing, Beijing (CN)

(72) Inventors: Jianliang Zhang, Beijing (CN); Zhengjian Liu, Beijing (CN); Guangwei Wang, Beijing (CN); Runsheng Xu, Beijing (CN); Kexin Jiao, Beijing (CN); Kejiang Li, Beijing (CN); Zhenyang Wang, Beijing (CN); Cui Wang, Beijing (CN); Xiaojun Ning, Beijing (CN)

(73) Assignee: UNIVERSITY OF SCIENCE AND TECHNOLOGY BEIJING, Beijing (CN)

(*) Notice: Subject to any disclaimer, the term of this patent is extended or adjusted under 35 U.S.C. 154(b) by 842 days.

(21) Appl. No.: 17/631,426

(22) PCT Filed: Jul. 17, 2020

(86) PCT No.: PCT/CN2020/102745
§ 371 (c)(1),
(2) Date: Jan. 28, 2022

(87) PCT Pub. No.: WO2022/011693
PCT Pub. Date: Jan. 20, 2022

(65) Prior Publication Data
US 2022/0275280 A1   Sep. 1, 2022

(51) Int. Cl.
*C10B 57/02* (2006.01)
*C10B 53/04* (2006.01)
*C10B 57/14* (2006.01)

(52) U.S. Cl.
CPC .............. *C10B 57/02* (2013.01); *C10B 53/04* (2013.01); *C10B 57/14* (2013.01)

(58) Field of Classification Search
CPC ......... C10B 53/04; C10B 57/02; C10B 57/04; C10B 57/14; C21B 5/003; C21B 5/007
See application file for complete search history.

(56) References Cited

FOREIGN PATENT DOCUMENTS

| CN | 101899343 A | 12/2010 |
|---|---|---|
| CN | 103952503 A | 7/2014 |

(Continued)

OTHER PUBLICATIONS

English-language machine translation of CN 105907413 A (Year: 2016).*

(Continued)

*Primary Examiner* — James C Goloboy
(74) *Attorney, Agent, or Firm* — Cheng-Ju Chiang

(57) ABSTRACT

An optimization method for a directional preparation technique and efficient use of semi-coke for blast furnace injection. Firstly, the volatile and the ash content of target semi-coke are preset, and then the volatile and the ash removal percentages of a raw coal are calculated; after ash removal, several sets of dry distillation carbonization temperatures and carbonization times are obtained according to the volatile removal percentage, and the relationships between a combustion rate, abrasiveness, explosiveness and jet flow property and the carbonization temperature are respectively established to obtain the optimal actual carbonization temperature; and semi-coke for blast furnace injection is obtained at an actual carbonization temperature. The directional preparation is suitable for the semi-coke for blast furnace injection, and an optimal coal-compounding scheme (Continued)

is obtained, thus achieving the efficient and safe injection of blast furnace iron-making fuels, and energy conservation and emission reduction.

9 Claims, 4 Drawing Sheets

(56) References Cited

FOREIGN PATENT DOCUMENTS

| | | | | |
|---|---|---|---|---|
| CN | 102443664 B | 11/2015 | | |
| CN | 105295975 A | 2/2016 | | |
| CN | 105838402 A | 8/2016 | | |
| CN | 105907413 A | * 8/2016 | ............. | B01D 50/00 |
| CN | 107189794 A | * 9/2017 | | |
| CN | 107400743 A | 11/2017 | | |
| CN | 108531674 A | 9/2018 | | |
| WO | 2013/108768 A1 | 7/2013 | | |

OTHER PUBLICATIONS

English-language machine translation of CN 107189794 A (Year: 2017).*

Chong Zou, Bao Li, Junxue Zhao, Xiaoming Li, "Effects of Pyrolysis Temperature on Grindability of Char Using Pulverized Coal Injection in Blast Furnace", Clean Coal Technology, Jan. 2016, pp. 71-76, vol. 22, Issue No. 1, China Academic Journal Electronic Publishing House.

* cited by examiner

OPTIMIZATION METHOD FOR DIRECTIONAL PREPARATION TECHNIQUE AND EFFICIENT USE OF SEMI-COKE FOR BLAST FURNACE INJECTION

CROSS REFERENCE TO RELATED APPLICATIONS

This application is a 35 U.S.C. § 371 National Phase conversion of International (PCT) Patent Application No. PCT/CN2020/102745, filed on Jul. 17, 2020, the entire content of which is incorporated into this application herein by reference. The PCT International patent Application was filed and published in Chinese.

TECHNICAL FIELD

The disclosure belongs to the technical field of metallurgy, and particularly relates to a directional preparation technology of semi-coke for blast furnace injection and an optimization method for efficient use of semi-coke for blast furnace injection.

BACKGROUND

Blast furnace iron-making is currently under great pressure to meet the requirements of energy saving and emission reduction. Blast furnace coal injection is an important technical means to reduce coke consumption in blast furnace iron-making, and is of great significance for blast furnace iron-making to reduce the consumption of scarce coking coal resources and reduce pollution emissions during the coke production process. However, traditional blast furnace coal injection mainly uses high-quality anthracite resources. Anthracite has very few reserves in China and is a non-renewable resource, and its scarcity continues to become prominent. Therefore, Chinese iron smelters have been working hard to extend the scope of fuels for blast furnace injection. As a by-product from low-rank coal after oil extraction and modification in the coal chemical industry, semi-coke is much cheaper than coke, and has a large production capacity in China. In recent years, researchers have proposed the use of semi-coke as a raw material for blast furnace injection based on the advantages of high fixed carbon content, low sulfur content, low ash content, and the like of the semi-coke. For example, Chinese invention patent CN201210018465.0 has disclosed a low-cost blast furnace iron-making method, in which semi-coke is introduced into blast furnace injection for secondary utilization, and used with tamping coke for blast furnace iron-making. Although the method has achieved certain results, it still faces with many problems, which restrict the large-scale use of semi-coke in blast furnaces. For example, semi-coke has the characteristics of great fluctuation in component and low grindability, which bring greater hidden dangers to the safety of pulverizing and injection processes of blast furnace coal injection, and significantly increase the coal pulverizing cost, thereby limiting the application of semi-coke in blast furnace injection.

Aiming at the problem of lower grindability, Chinese invention patent CN201810419081.7 has disclosed a method for preparing blast furnace injection coal powder by using semi-coke as a raw material for blast furnace injection. In the method, firstly, semi-coke is prepared into pre-prepared powder which is then mixed with bituminous coal or anthracite, and semi-coke particles and the bituminous coal or anthracite form a particle size difference, thereby accelerating the grinding effect of the semi-coke particles, and solving the problem that the semi-coke is difficult to grind in the existing process. However, the increase extent of the grindability index is limited only by the particle size difference. Moreover, the grindability is related to the proportion of semi-coke to bituminous coal or anthracite, and the proportion of semi-coke to bituminous coal or anthracite is closely related to the cost performance of blast furnace injection. Therefore, the proportion of semi-coke to bituminous coal or anthracite may not be able to balance high cost performance and high grindability at the same time. Zou Chong et al. proposed that the use of lower carbonization temperature can improve the grindability of semi-coke (Zou Chong, Li Bao, Zhao Junxue, Research on Influence of Dry Distillation Temperature on Grindability of Semi-coke for Blast Furnace Injection [J], Clean Coal Technology, 2016, 22(1): 71-76). However, the formulation of an optimal carbonization temperature also needs to consider the components, combustibility, reactivity and many other characteristics of the blast furnace injection coal. Chinese invention patent CN201610339590.X has disclosed a low-temperature dry distillation furnace for preparing semi-coke and a method for preparing semi-coke. Semi-coke can be prepared by optimizing the carbonization temperature, heating gas, cooling and other processes. However, this method does not specifically optimize the semi-coke process according to the requirements of blast furnace injection, and thus, the prepared semi-coke may not be suitable for blast furnace injection. Therefore, to prepare injection semi-coke meeting the requirements of blast furnace smelting, various metallurgical performance of semi-coke must be comprehensively considered from the perspective of blast furnaces, thereby discussing semi-coke preparation process parameters and raw material pretreatment schemes that match the optimal metallurgical performance, so as to realize directional production.

In addition, steel enterprises often use semi-coke and pulverized coal for mixed injection in the aspect of blast furnace mixed injection. For example, Chinese invention patent CN201610331158.6 has disclosed a blast furnace coal injection method using semi-coke as part of the fuel. In this method, the semi-coke and ordinary pulverized coal are mixed for use, and relational expressions between the proportion of the semi-coke and the parameters such as hot air temperature, oxygen enrichment rate, coke thermal reactivity and strength after coke thermal reaction in the process of blast furnace injection are given. However, a suitable matching proportion of semi-coke to pulverized coal is not only related to blast furnace injection conditions, but also related to factors such as components, structures and combustion rates of semi-coke and pulverized coal. Moreover, in practical applications, the cost performance of application of semi-coke in blast furnace injection should be comprehensively considered, so as to realize the optimization of a semi-coke injection scheme and the maximization of economic benefits. At present, there is no scientific evaluation method to obtain a better matching scheme of semi-coke and pulverized coal, which limits the practical application value of semi-coke in blast furnace injection.

Based on the above, the disclosure provides a complete set of directional preparation technology of semi-coke for blast furnace injection and optimization method of an injection scheme for semi-coke, and has important guiding significance for expansion of blast furnace iron-making injection fuel resources, efficient injection, and energy saving and emission reduction.

SUMMARY

In view of the above defects in the prior art, an objective of the disclosure is to provide a directional preparation technology of semi-coke for blast furnace injection. A volatile matter removal percentage and an ash removal percentage of raw coal can be obtained according to volatile matter and ash contents of target semi-coke, relationships between semi-coke carbonization process parameters and semi-coke injection performance parameters are established by systematic experiment tests to obtain a process route for preparing semi-coke with optimal injection performance, and finally, carbonization is performed to obtain high-performance semi-coke.

Another objective of the disclosure is to provide an optimization method for efficient use of semi-coke for blast furnace injection. According to cost performance evaluation coefficients, based on the principle that the content of volatile matters in mixed coal is less than 25% and there is no strong explosibility, an optimal matching structure of semi-coke and low-rank coal can be obtained quickly and accurately.

To achieve the foregoing objective, the present invention adopts the following technical solutions:

A directional preparation technology of semi-coke for blast furnace injection includes performing dry distillation on raw coal to remove part of volatile matters to prepare the semi-coke for blast furnace injection, and includes the following steps:

S11. according to a limit value $W_{A_{standard}}$ of an ash percentage of target semi-coke, obtaining a relational expression between an ash removal percentage $W_A$ in the raw coal and a volatile matter removal percentage $W_{B_{removal}}$ during dry distillation, as shown in Formula (1):

$$W_{A_{removal}} = \frac{W_{A_{coal}} - W_{A_{standard}}(1 - W_{B_{removal}})}{1 - W_{A_{standard}}} \quad (1)$$

in the formula, $W_{A_{coal}}$ represents a percentage of ash in the raw coal.

According to the regulations in blast furnace oxygen-enriched coal injection technical specifications (National Standard GB/T 33969-2017), the ash content suitable for blast furnace injection coal is 12% or below, and for a blast furnace with a large furnace capacity, the ash content is required to be ≤9%, so the limit value of the ash percentage in the target semi-coke should meet: $W_{A_{standard}} \leq 12\%$.

A derivation process of Formula (1) is as follows:

under normal conditions, main components of the raw coal include ash, fixed carbon and volatile matters (taking a dry basis as an analysis basis). After dry distillation and carbonization are performed on the raw coal to obtain semi-coke, the lost components are mainly volatile matters. Therefore, before the ash is removed, the mass of the prepared semi-coke is equal to the mass of the raw coal minus a volatile matter removal volume; and after the ash is removed, the mass of the prepared semi-coke is equal to the mass of the raw coal minus the volatile matter removal volume and an ash removal volume, that is, the mass of the semi-coke prepared before the ash is removed minus the ash removal volume. According to this condition, assuming that the ash removal volume is x, the total mass of the raw coal is $m_{coal}$, and the total mass of the semi-coke prepared before the ash is removed is $m_{semi-coke}$, the following formulas are met:

$$\frac{m_{coal} \times W_{A_{coal}} - x}{m_{semi-coke} - x} = W_{A_{standard}} \quad (11)$$

$$m_{semi-coke} = m_{coal} - m_{coal} \times W_{B_{removal}} \quad (12)$$

in the formulas, $m_{coal} \times W_{A_{coal}} - x$ represents an ash content in the semi-coke prepared after the ash is removed, and $m_{semi-coke} - x$ represents the mass of the semi-coke prepared after the ash is removed.

According to Formulas (11) and (12), a formula for ash removal volume is obtained as follows:

$$x = \frac{m_{coal} \times W_{A_{coal}} - W_{A_{standard}} m_{coal}(1 - W_{B_{removal}})}{1 - W_{A_{standard}}} \quad (13)$$

$$W_{A_{removal}} = \frac{x}{m_{coal}} = \frac{W_{A_{coal}} - W_{A_{standard}}(1 - W_{B_{removal}})}{1 - W_{A_{standard}}}$$

Therefore, according to the ash removal percentage equal to the ash removal volume divided by the mass of the raw coal, Formula (1) is obtained. According to Formula (1), when the ash removal percentage is less than or equal to 0, it means that no ash removal treatment is required; and when the ash removal percentage is greater than 0, it means that ash removal treatment is required, that is, Formula (2) given in step S12 is obtained.

S12. According to Formula (1) obtained in step S11, presetting a volatile matter removal percentage during dry distillation, wherein if the preset volatile matter removal percentage $W_{B_{removal}}$ meets Formula (2), ash removal treatment is performed on the raw coal, and the ash removal percentage should be greater than or equal to a calculation result of Formula (1); otherwise, the ash removal treatment does not need to be performed on the raw $$W_{B_{removal}} \geq \frac{W_{A_{standard}} - W_{A_{coal}}}{W_{A_{standard}}}. \quad (2)$$

By using the above technical scheme, the ash removal percentage in the raw coal is correlated with the volatile matter removal percentage, and thus, the content of volatile matters in the semi-coke to be prepared can be pre-designed. The volatile matter removal percentage can be obtained according to the content of volatile matters in the semi-coke, and then, according to the volatile matter removal percentage, whether the ash needs to be removed is determined and the ash removal percentage is obtained. As a result, whether the raw coal needs to be subjected to ash removal pretreatment can be determined, and preparation parameters such as the volatile matter removal percentage and the ash removal percentage can be directionally designed according to the target semi-coke.

S13. Performing dry distillation on the raw coal treated in step S12 to remove part of volatile matters, wherein a method for determining a carbonization temperature of dry distillation includes: guided by the preset volatile matter removal percentage $W_{B_{removal}}$ in step S12, preliminarily determining a plurality of groups of carbonization temperatures and carbonization times of dry distillation, then, according to the plurality of groups of the carbonization temperatures and carbonization times, performing dry distillation and carbonization on the raw coal at different carbonization temperatures and carbonization times to prepare semi-coke, and subsequently, performing an injection performance test on the semi-coke under different conditions to respectively obtain relationships between parameters including combustion rate, grindability index, explosibility index and jet flow index of the semi-coke and the carbonization temperature and time.

Under normal conditions, to remove the preset volatile matter removal percentage, it is mainly necessary to limit the dry distillation and carbonization temperature and time of the raw coal. Generally, the higher the carbonization temperature, the shorter the carbonization time, so a plurality of groups of corresponding carbonization temperatures and times can be obtained. Although semi-coke with the same content of volatile matters can be obtained through different carbonization temperatures and times, the performance such as combustion rate, grindability, explosibility and jet flow performance of the semi-coke may be different. A blast furnace requires an injection fuel to have high combustibility, high grindability, high safety and high injection performance, so suitable semi-coke needs to have the characteristics of good combustibility, no explosibility and good grindability and jet flow performance while the components meet the requirements. Therefore, relationships between different carbonization temperatures and performance parameters such as combustion rate, grindability index, explosibility index and jet flow index are established to determine an optimal carbonization temperature.

A plurality of groups of carbonization temperatures and times corresponding to the volatile matter removal percentage can be obtained by analysis of a pyrolysis weight loss behavior in dry distillation and carbonization processes, or obtained by performing dry distillation and carbonization on a small amount of raw coal at different carbonization temperatures and carbonization times and then testing the volatile matter removal percentage.

S14. According to the relationship between the explosibility index and the carbonization temperature in step S13, determining a lower limit value of the carbonization temperature, and then, in temperature intervals higher than the lower limit value of the carbonization temperature, according to the relationships between the combustion rate, the grindability index and the jet flow index and the carbonization temperature, selecting a temperature interval in which the combustion rate, the grindability index and the jet flow index are all excellent as an actual carbonization temperature of dry distillation of the raw coal.

The greater the explosibility index, the stronger the explosibility of the semi-coke, and the semi-coke for blast furnace injection needs to meet weak explosibility or no explosibility. Experimental results show that when the carbonization temperature is lower, the explosibility is stronger, so the lower limit value of the carbonization temperature can be preliminarily determined through the explosibility index. Then, according to the combustion rate, the grindability index and the jet flow index, the temperature interval in which the combustion rate, the grindability index and the jet flow index are all excellent can be obtained to serve as the actual carbonization temperature of dry distillation of the raw coal.

S15. According to the carbonization time obtained in step S13 and the actual carbonization temperature obtained in step S14, performing dry distillation and carbonization on the raw coal, and then, cooling to obtain the semi-coke for blast furnace injection.

In an actual production process of semi-coke, the carbonization temperature and the carbonization time are determined by parameters such as heating gas temperature and charge rate of a shaft furnace, so that CFD numerical simulation is used to further determine the heating gas temperature and the charge rate during dry distillation and carbonization.

During blast furnace injection, the semi-coke can be injected separately, or the semi-coke can be mixed with low-rank coal for injection. When the semi-coke is injected separately, the process is simple, that is, after the pulverized semi-coke is injected, the semi-coke is evenly injected to each air vent of a blast furnace. In order to further reduce the cost of the blast furnace injection fuel, the semi-coke is usually mixed with cheap low-rank coal for injection, so that it is necessary to optimize a proportion of semi-coke to low-rank coal, namely a blending scheme, so as to realize maximization of economic benefits and use value. Therefore, the following technical scheme is used to optimize the blending scheme.

An optimization method for efficient use of semi-coke for blast furnace injection is provided, the semi-coke and low-rank coal are mixed to obtain a mixed fuel, the mixed fuel is used for mixed injection, and an optimization method for efficient use of the mixed fuel includes the following steps:

S21. according to cost and combustion performance of the semi-coke and the low-rank coal, obtaining a calculation formula of a cost performance evaluation coefficient of the mixed fuel, as shown in Formula (3).

$$R = \frac{Q_{low} \times \eta}{(C_{low-rank\ coal} \times W_{low-rank\ coal} + C_{semi-coke} \times W_{semi-coke}) + \frac{60}{H_{mixing}} \times C_{pulverizing} + \frac{70}{I_{mixing}} \times C_{injection}} \quad (3)$$

in the formula, $Q_{low}$ represents a low calorific value of the mixed fuel, kJ/kg, $\eta$ represents a combustion rate of the mixed fuel, $C_{low-rankcoal}$ represents a purchase cost of the low-rank coal, RMB/kg, $C_{semi-coke}$ represents a purchase cost of the semi-coke, RMB/kg, $W_{low-rank\ coal}$ represents a proportion of the low-rank coal, $W_{semi-coke}$ represents a proportion of the semi-coke, $H_{mixing}$ represents a grindability index of the mixed fuel, $C_{pulverizing}$ represents a pulverizing cost per kilogram of standard coal, RMB/kg, $I_{mixing}$ represents a jet flow index of the mixed fuel, and $C_{injector}$ represents a gas delivery cost per kilogram of standard coal, RMB/kg; and S22. taking the cost performance evaluation coefficient obtained in step S21 as a constraint condition, the greater the cost performance evaluation coefficient, the better the semi-coke blending scheme, and according to this principle, determining a proportion interval of the semi-coke and the low-rank coal in the mixed fuel.

By using the above formula of the cost performance evaluation coefficient as a main determinant of a blending scheme, the combustion performance during blast furnace injection and the purchase cost, pulverizing cost and delivery cost of the injection fuel can be taken into consideration at the same time, and the obtained cost performance evaluation coefficient has high reliability and rationality and has relatively strong guiding significance for an actual blending scheme of the blast furnace injection fuel. By using this cost performance evaluation coefficient, a blending scheme can be obtained quickly and accurately so as to realize the economic maximization and value maximization of the semi-coke in blast furnace injection.

Beneficial Effects

Compared with the prior art, the directional preparation technology of semi-coke for blast furnace injection and the optimization method for efficient use of semi-coke for blast furnace injection provided by the disclosure have the following beneficial effects:

(1) In the directional preparation technology of semi-coke for blast furnace injection provided by the disclosure, according to the volatile matter and ash contents of the target semi-coke for blast furnace injection, the volatile matter and ash removal percentages in the raw coal are obtained, and the ash is removed. Then, a plurality of groups of dry distillation and carbonization temperatures and carbonization times are obtained through theoretical calculation, relationships between the carbonization temperature and blast furnace injection performance parameters such as combustion rate, grindability, explosibility and jet flow performance are established through dry distillation and carbonization experiments of a small amount of raw materials, so as to obtain the optimal actual carbonization temperature, and finally, high-performance semi-coke is obtained through carbonization. In the disclosure, by using the above technical scheme, the ash removal percentage, the carbonization temperature and the carbonization time can be obtained through theoretical calculation according to the content of volatile matters in the target semi-coke, and then, parameters such as the heating gas temperature and the charge rate can also be obtained. Dry distillation and carbonization are performed according to the obtained theoretical parameters, so as to directionally obtain the high-performance semi-coke suitable for blast furnace injection. The whole preparation technology has strong theoretical support and high reliability and repeatability, and effectively expands the preparation and application of semi-coke in blast furnace injection.

(2) In the directional preparation technology of semi-coke for blast furnace injection provided by the disclosure, firstly, according to the content of volatile matters in the target semi-coke for blast furnace injection, semi-coke preparation experiments with a plurality of groups of dry distillation and carbonization temperatures and carbonization times are designed, and then, relationships between the combustion rate, grindability, explosibility and jet flow performance and the carbonization temperature can be established, so as to obtain the optimal actual carbonization temperature. Therefore, the disclosure can reasonably and accurately design the process parameters of dry distillation and carbonization, and can also correlate the carbonization temperature with the performance that needs to be met by the semi-coke for blast furnace injection, so as to directionally prepare the high-performance semi-coke suitable for blast furnace injection.

(3) In the directional preparation technology of semi-coke for blast furnace injection provided by the disclosure, inert gases are used to cool the semi-coke, thereby significantly reducing the moisture content in the semi-coke, and overcoming the problem that the semi-coke obtained by a water cooling method commonly used in the prior art has a high moisture content and thus is not conducive to blast furnace smelting. In the disclosure, the cooled semi-coke is pulverized, and the mass percentage of the pulverized semi-coke with a particle size of less than 0.074 mm can be not less than 75%, which indicates that the prepared semi-coke has good grindability.

(4) In the optimization method for efficient use of semi-coke for blast furnace injection provided by the disclosure, the semi-coke and the low-rank coal are mixed for use so as to realize maximization of economic benefits and use value. According to cost performance evaluation coefficients, based on the constraint conditions that the content of volatile matters is less than 25% and there is no strong explosibility, the optimal proportion of semi-coke to low-rank coal can be obtained. By using the cost performance evaluation coefficient summarized by the disclosure as the main determinant of a blending scheme, the combustion performance during blast furnace injection and the purchase cost, pulverizing cost and delivery cost of the injection fuel can be taken into consideration at the same time, and the obtained cost performance evaluation coefficient has high reliability and rationality and has relatively strong guiding significance for an actual blending scheme of the blast furnace injection fuel. By using this cost performance evaluation coefficient, a blending scheme can be obtained quickly and accurately so as to realize the economic maximization and value maximization of the semi-coke in blast furnace injection.

(5) The disclosure provides a complete set of directional preparation technology of semi-coke for blast furnace injection and optimization method of a blast furnace injection scheme for semi-coke, and has important guiding significance for expansion of fuel resources for blast furnace iron-making injection, efficient injection, as well as energy saving and emission reduction.

DETAILED DESCRIPTION

The following clearly and completely describes the technical solutions in the embodiments of the present invention. Apparently, the described embodiments are some of the embodiments of the present invention rather than all of the embodiments. All other embodiments obtained by a person of ordinary skill in the art based on the embodiments of the present invention without creative efforts shall fall within the protection scope of the present invention.

Example 1

Figure 1:
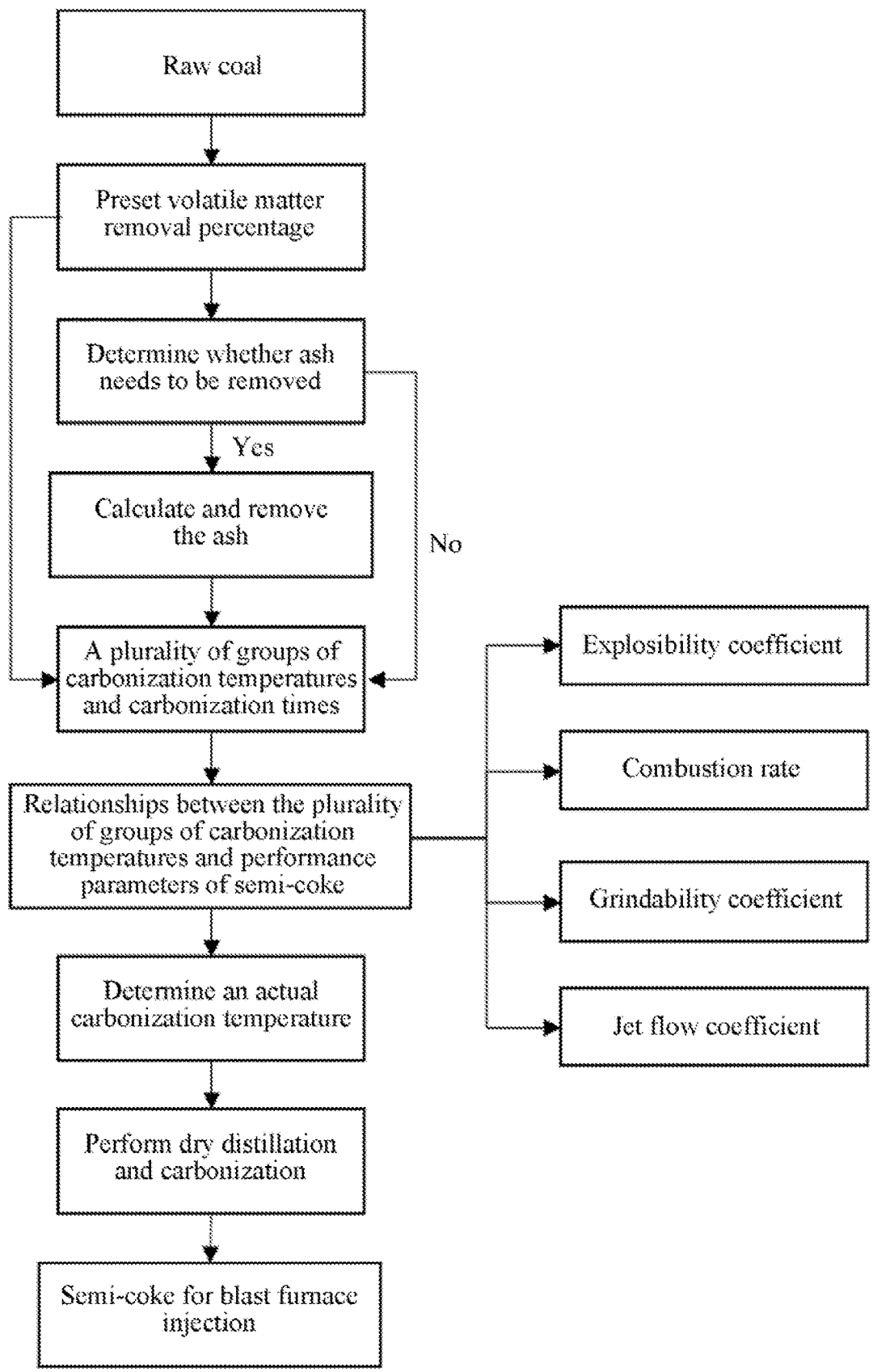
FIG. 1 is a flow block diagram of a directional preparation technology of semi-coke for blast furnace injection provided by the disclosure.
Figure 2:
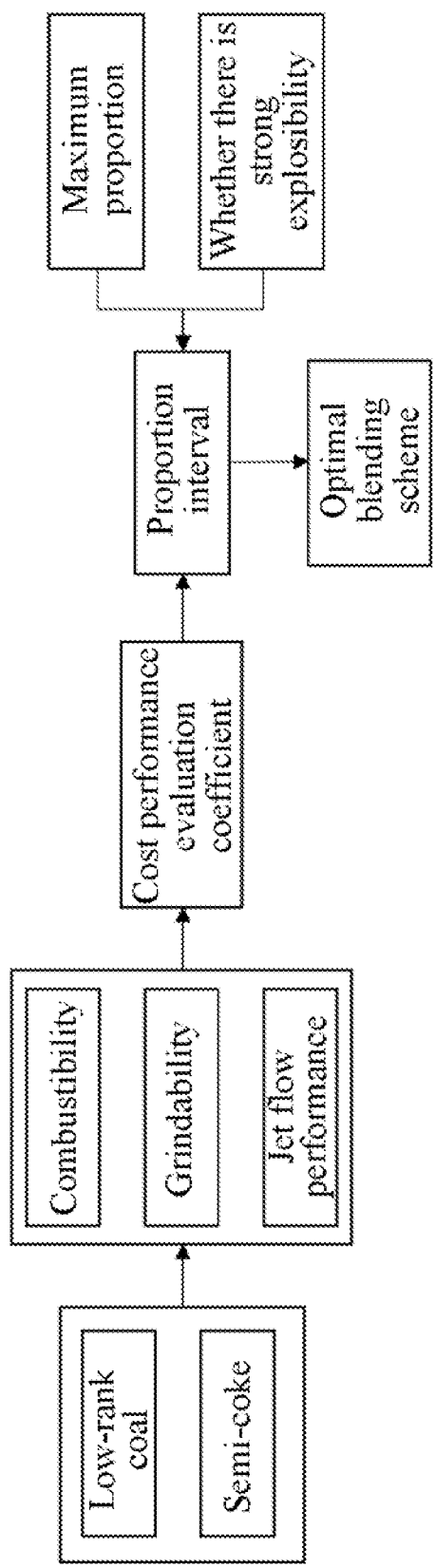
FIG. 2 is a flow block diagram of an optimization method for efficient use of semi-coke for blast furnace injection provided by the disclosure.

As shown in FIG. 1 and FIG. 2, a directional preparation technology of semi-coke for blast furnace injection includes the following steps:

(1) Raw coal for preparing semi-coke was selected, the components of the raw coal are shown in Table 1, and the raw coal was dried and screened to obtain raw coal with a particle size of 5-20 mm.

TABLE 1

Technical indexes of raw coal and target semi-coke (taking dry basis as analysis basis)

| Coal type | Ash/% | Fixed carbon/% | Volatile matters/% |
|---|---|---|---|
| Raw coal 1 | 10.49 | 52.83 | 36.68 |
| Target semi-coke 1 | 12 | 77.29 | 10.71 |
| Target semi-coke 1-1 (without removing ash) | 14.79 | 74.5 | 10.71 |
| Target semi-coke 1-2 (without removing ash) | 13.20 | 76.09 | 10.71 |
| Raw coal 2 | 6.39 | 58.19 | 35.42 |
| Target semi-coke 2 | 8.02 | 73.03 | 18.95 |
| Target semi-coke 2-1 | 8.71 | 72.34 | 18.95 |
| Raw coal 3 | 6.15 | 59.80 | 34.05 |
| Target semi-coke 3 | 7.29 | 70.88 | 21.82 |
| Target semi-coke 3-1 | 9.05 | 69.13 | 21.82 |

(2) The content of volatile matters in target semi-coke 1 was pre-designed to be 10.71%, and then, when the ash removal treatment was not performed on the raw coal (as shown in the coal type of target semi-coke 1-1 (without removing ash) in Table 1), after the volatile matters were removed, the ash content obtained through theoretical calculation was 14.79% which was greater than 12%, so ash removal pretreatment needed to be performed on the raw coal. According to the percentages of ash, fixed carbon and volatile matters in the target semi-coke 1 in Table 1, a volatile matter removal percentage $W_{B_{removal}}$ can be obtained according to the following formula:

$$W_{B_{removal}} = \frac{W_{C_{semi-coke}} W_{B_{coal}} - W_{C_{coal}} W_{B_{semi-coke}}}{W_{C_{semi-coke}}} =$$

$$\frac{77.29\% \times 36.68\% - 52.83\% \times 10.71\%}{77.29\%} = 29.36\%$$

And then, $$W_{B_{removal}} = 29.36\% \geq \frac{W_{A_{standard}} - W_{A_{coal}}}{W_{A_{standard}}} = \frac{12\% - 10.49\%}{12\%} = 12.58\%.$$

Therefore, the ash removal treatment needed to be performed on the raw coal.

In the formula, $W_{C_{semi-coke}}$ represents a content of fixed carbon in the target semi-coke, $W_{C_{coal}}$ represents a content of fixed carbon in the raw coal, $W_{B_{coal}}$ represents a content of volatile matters in the raw coal, and $W_{B_{semi-coke}}$ represents a content of volatile matters in the semi-coke.

Then, the ash removal percentage was calculated according to Formula (1):

$$W_{A_{removal}} = \frac{W_{A_{coal}} - W_{A_{standard}}(1 - W_{B_{removal}})}{1 - W_{A_{standard}}} =$$

$$\frac{10.49\% - 12\% \times (1 - 29.36\%)}{1 - 12\%} = 2.28\%$$

or the ash removal percentage could also be obtained by the following formula:

$$W_{A_{removal}} = \frac{(W_{C_{semi-coke}} W_{A_{coal}} - W_{C_{coal}} W_{A_{standard}}) \times (1 - W_{B_{removal}})}{W_{C_{coal}} + W_{C_{semi-coke}} W_{A_{coal}} - W_{C_{coal}} W_{A_{standard}}} =$$

$$\frac{(77.29\% \times 10.19\% - 52.83\% \times 12\%) \times (1 - 29.36\%)}{52.83\% + 77.29\% \times 10.49\% - 52.83\% \times 12\%} = 2.28\%$$

According to the ash removal percentage, the raw coal was treated by a heavy medium coal preparation technology to remove ash, that was, in a process of gravity concentration, water or air with a density lower than that of the selected ore was used as a separating medium, the raw coal was reversely separated in a heavy medium according to the difference in particle density, and the ash percentage of the raw coal after ash removal was about 8.21%. In the disclosure, the ash removal percentage is correlated with the volatile matter removal percentage in the raw coal, and the content of volatile matters in the target semi-coke can be pre-designed. The volatile matter removal percentage can be obtained according to the content of volatile matters in the semi-coke, and then, according to the volatile matter removal percentage, whether the ash needs to be removed is determined and the ash removal percentage is obtained. As a result, whether the raw coal needs to be subjected to ash removal pretreatment can be determined, and preparation parameters such as the volatile matter removal percentage and the ash removal percentage can be directionally designed according to the target semi-coke.

(3) Dry distillation was performed on the raw coal treated in step (2) to remove part of volatile matters, and a method for determining a carbonization temperature of dry distillation included: guided by the preset volatile matter removal percentage 29.36% in step S12, a plurality of groups of carbonization temperatures and carbonization times of dry distillation were preliminarily determined, as shown in Table 2.

TABLE 2

A plurality of groups of carbonization temperatures and carbonization times

| Group | 1 | 2 | 3 | 4 | 5 |
|---|---|---|---|---|---|
| Carbonization temperature (° C.) | 300 | 400 | 500 | 600 | 700 |
| Carbonization time (min) | 120 | 120 | 90 | 60 | 30 |

According to the plurality of groups of the carbonization temperatures and carbonization times, dry distillation and carbonization were performed on the raw coal at different carbonization temperatures and carbonization times to prepare semi-coke, and the injection performance of the semi-coke under different process conditions was analyzed to respectively obtain relationships between parameters of the semi-coke including combustion rate, grindability index, explosibility index and jet flow index and the carbonization temperature, as shown in FIG. 3 to FIG. 6. The combustion rate was measured by a comprehensive thermal analyzer; the grindability index was measured by a Hastelloy grinder; and the jet flow performance was measured by a comprehensive powder performance tester.

Figure 3:
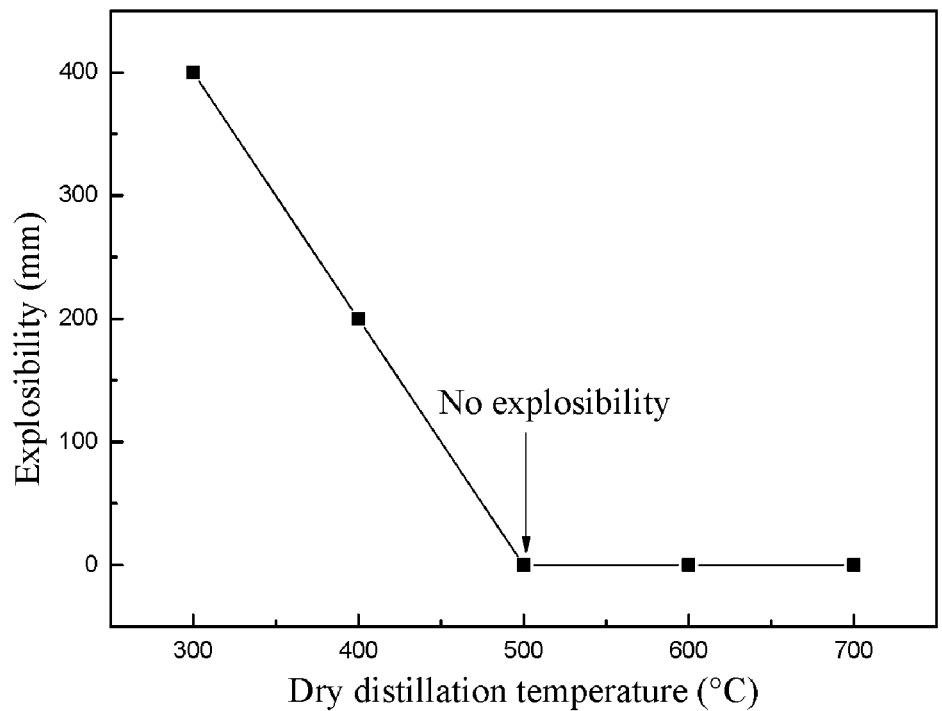
FIG. 3 is a relationship curve of explosibility index of semi-coke and dry distillation temperature in Example 1.
Figure 4:
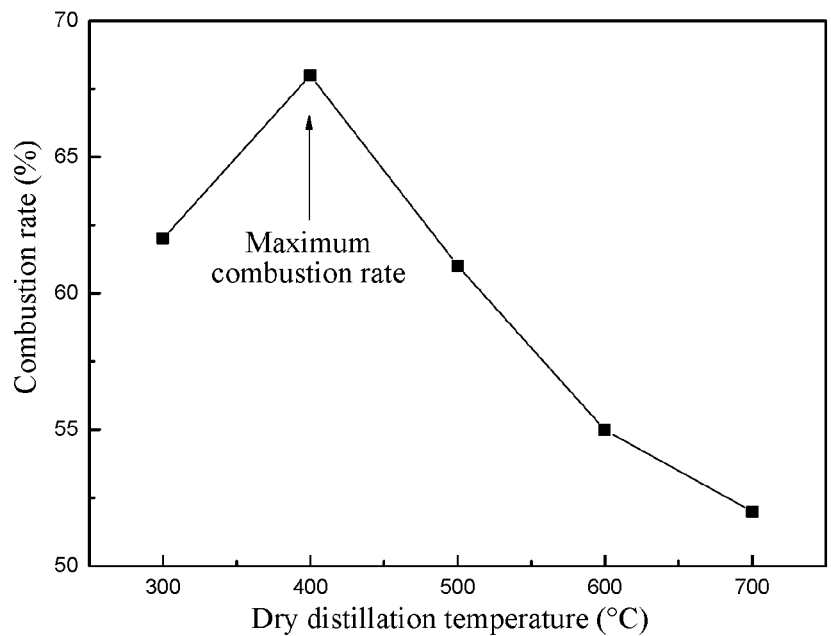
FIG. 4 is a relationship curve of combustion rate of semi-coke and dry distillation temperature in Example 1.
Figure 5:
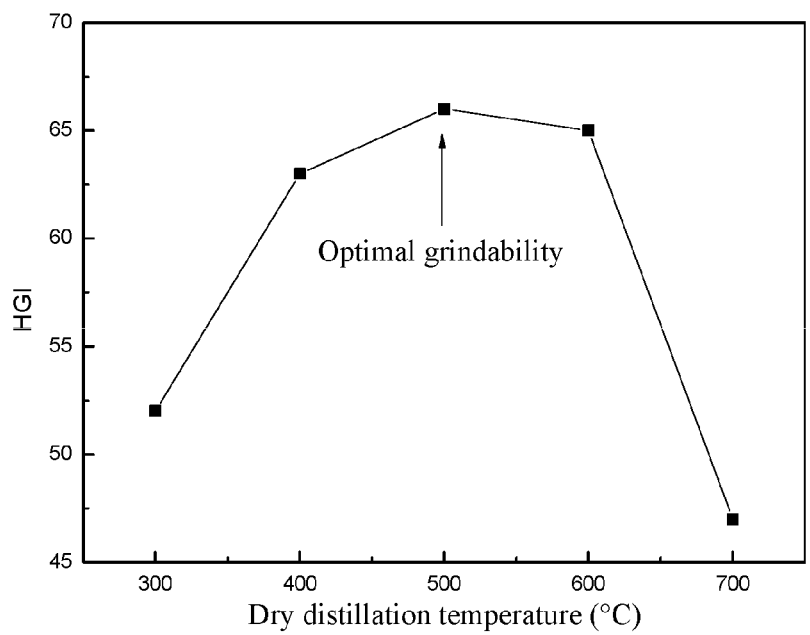
FIG. 5 is a relationship curve of grindability index of semi-coke and dry distillation temperature in Example 1.
Figure 6:
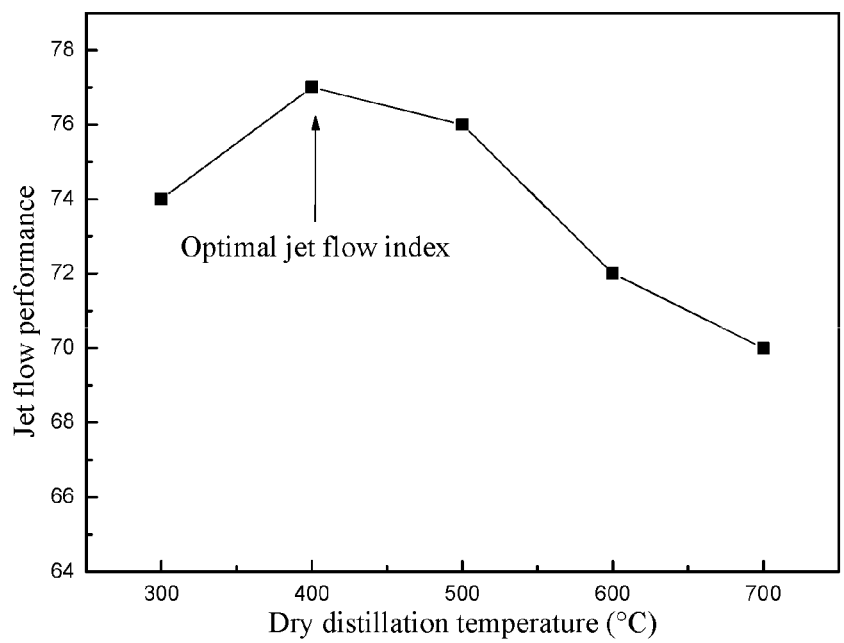
FIG. 6 is a relationship curve of jet flow index of semi-coke and dry distillation temperature in Example 1.

According to the relationship between the explosibility index and the carbonization temperature in FIG. 3, it can be seen that when the explosibility index is 200 mm, the temperature is about 400° C., so the lower limit value of the carbonization temperature is 400° C. Then, according to FIG. 4 to FIG. 6, it can be concluded that when the combustion rate, the grindability index and the jet flow index are all higher, the upper limit value of the carbonization temperature is determined to be 500° C. Therefore, an optimal interval of the actual carbonization temperature is 400-500° C.

A blast furnace requires an injection fuel to have high combustibility, high grindability, high safety and high injection performance, so suitable semi-coke needs to have the characteristics of good combustibility, no explosibility as well as good grindability and jet flow performance while the components meet the requirements. Therefore, relationships between different carbonization temperatures and performance parameters such as combustion rate, grindability index, explosibility index and jet flow index are established to determine an optimal carbonization temperature.

(4) Dry distillation and carbonization were performed in the optimal interval of the actual carbonization temperature, and the carbonization time was determined by the same method as step (3). The carbonization temperature and the carbonization time were determined by parameters such as heating gas temperature and charge rate, so that the heating gas temperature and the charge rate during dry distillation and carbonization were further determined so as to perform carbonization. After the carbonization was completed, a dry quenching process was used to cool the semi-coke, that was, high-temperature semi-coke discharged from a carbonization furnace was filled into a dry quenching furnace through a collection tank, the cooling inert gas was blown into the bottom of the dry quenching furnace to exchange heat with the high-temperature semi-coke in the furnace, the high-temperature semi-coke was gradually cooled and then discharged from the bottom of the furnace, and high-temperature flue gas was discharged from the top of the furnace and then recycled after cooling and dust removal. Then, pulverization was performed to obtain pulverized semi-coke, and the mass percentage of the pulverized semi-coke with a particle size of less than 0.074 mm was not less than 75%. The performance parameters of the prepared semi-coke are shown in Table 3.

TABLE 3

Performance parameters of semi-coke

| Performance index | Low calorific value (kJ/kg) | 700° C. Combustion rate (%) | Explosibility (mm) | Grindability | Jet flow performance |
|---|---|---|---|---|---|
| Semi-coke | 30224.07 | 81 | 10 | 65 | 72 |

It can be seen from Table 3 that the semi-coke prepared by the disclosure has good combustion performance, weak explosibility, high grindability and high jet flow performance.

In view of the difference between actual carbonization results of the raw coal and theoretical calculations, the disclosure performs actual carbonization treatment on the raw coal which is not subjected to ash removal treatment (as shown in coal type of target semi-coke 1-2 (without removing ash) in Table 1), and tests the technical indexes of the obtained semi-coke to verify the difference between actual values and theoretical calculations (as shown in coal type of target semi-coke 1-1 (without removing ash) in Table 1). The content of volatile matters in the target semi-coke is predesigned to be 10.71%, carbonization treatment is performed on the raw coal by methods substantially the same as those in steps (3) and (4), and finally obtained actual values are as shown in coal type of target semi-coke 1-2 (without removing ash) in Table 1.

Example 2

A directional preparation technology of semi-coke for blast furnace injection includes the following steps:

Raw coal for preparing semi-coke was selected, the components of the raw coal 2 are shown in Table 1, and the raw coal was dried and screened to obtain raw coal with a particle size of 5-20 mm.

According to the percentages of ash, fixed carbon and volatile matters in the target semi-coke 2 in Table 1, a volatile matter removal percentage could be calculated by the same method as in Example 1:

$$W_{B_{removal}} = \frac{W_{C_{semi-coke}} W_{B_{coal}} - W_{C_{coal}} W_{B_{semi-coke}}}{W_{C_{semi-coke}}} =$$

$$\frac{73.03\% \times 35.42\% - 58.19\% \times 18.59\%}{73.03\%} = 20.32\%$$

and then, $$W_{B_{removal}} = 20.32\% \leq \frac{W_{A_{standard}} - W_{A_{coal}}}{W_{A_{standard}}} = \frac{12\% - 6.39\%}{12\%} = 46.75\%.$$

Therefore, ash removal treatment was not needed.

(3) Dry distillation was performed on the raw coal treated in step (2) to remove part of volatile matters, and a method for determining a carbonization temperature of dry distillation included: guided by the preset volatile matter removal percentage 20.17% in step S12, a plurality of groups of carbonization temperatures and carbonization times of dry distillation were preliminarily determined, as shown in Table 4.

TABLE 4

A plurality of groups of carbonization temperatures and carbonization times

| Group | 1 | 2 | 3 | 4 | 5 |
|---|---|---|---|---|---|
| Carbonization temperature (° C.) | 300 | 400 | 500 | 600 | 700 |
| Carbonization time (h) | 120 | 120 | 90 | 60 | 30 |

Other steps were substantially the same as those in Example 1, and are not repeated here. The performance parameters of the finally prepared semi-coke are shown in Table 5.

TABLE 5

Performance parameters of semi-coke

| Performance index | Low calorific value (kJ/kg) | Combustion rate (%) | Explosibility (mm) | Grindability | Jet flow performance |
|---|---|---|---|---|---|
| Semi-coke | 29968.37 | 85 | 100 | 62 | 70 |

It can be seen from Table 5 that the semi-coke prepared by the disclosure has better combustion performance, weak explosibility, high grindability and high jet flow performance.

Actual carbonization treatment was performed on the target semi-coke 2, the technical indexes of the actually obtained semi-coke are shown in target semi-coke 2-1 in Table 1, and the content of ash in the actually obtained semi-coke is slightly greater than a theoretical value, but still less than 12%, so the requirement for ash in the semi-coke for blast furnace injection is meet.

Example 3

A directional preparation technology of semi-coke for blast furnace injection included: raw coal for preparing semi-coke was selected, the components of raw coal 3 and target semi-coke 3 are shown in Table 1, and the raw coal was dried and screened to obtain raw coal with a particle size of 5-20 mm.

Other steps were substantially the same as those in Example 1, and are not repeated here. The performance parameters of the finally prepared semi-coke are shown in Table 6.

TABLE 6

Performance parameters of semi-coke

| Performance index | Low calorific value (kJ/kg) | Combustion rate (%) | Explo-sibility (mm) | Grind-ability | Jet flow perfor-mance |
|---|---|---|---|---|---|
| Semi-coke | 28837.58 | 90 | 400 | 65 | 69 |

It should be noted that for smelting in different blast furnaces, the requirements for the upper limit value of pulverized coal ash are different. For a small blast furnace, the upper limit value may be 12%, and for a large blast furnace, the upper limit value may preferably be 9%, which is much strict.

The content of ash in the target semi-coke 3 is also slightly greater than a theoretical value, but still less than 12%, so the requirement for ash in the semi-coke for blast furnace injection is meet. Therefore, in actual production, the theoretical value can be calculated by reducing the $W_{A_{standard}}$ value, and then, carbonization process parameters can be designed according to the theoretical value to ensure that the actually obtained semi-coke meets the requirement for blast furnace injection.

Example 4

An optimization method for efficient use of semi-coke for blast furnace injection included the following steps:

(1) Bituminous coal and the semi-coke prepared in Example 1 were used as a mixed fuel, and technical indexes of the mixed fuel are shown in Table 7 and Table 8. The combustion rates in Table 8 are obtained by actually testing the bituminous coal and the semi-coke.

TABLE 7

Performance parameters of bituminous coal and semi-coke

| Coal type | Ash % | Fixed carbon % | Volatile matters % |
|---|---|---|---|
| Bituminous coal | 6.59 | 59.61 | 33.80 |
| Semi-coke | 12 | 77.29 | 10.71 |

TABLE 8

Performance parameters of mixed fuel

| Performance index | Low calorific value (kJ/kg) | Combustion rate % | Grind-ability | Jet flow performance |
|---|---|---|---|---|
| Bituminous coal | 27893.29 | 99.59 | 65 | 60 |
| Semi-coke | 30224.07 | 81 | 60 | 72 |

The relationship between the cost performance evaluation coefficient and the proportion of bituminous coal was obtained according to the following formula:

$$R = \frac{Q_{low} \times \eta}{(C_{low-rank\ coal} \times W_{low-rank\ coal} + C_{semi-coke} \times W_{semi-coke}) + \frac{60}{H_{mixing}} \times C_{pulverizing} + \frac{70}{I_{mixing}} \times C_{injection}}$$

$$H_{mixing} = H_{low-rank\ coal} \times W_{low-rank\ coal} + H_{semi-coke} \times W_{semi-coke}$$

$$I_{mixing} = I_{low-rank\ coal} \times W_{low-rank\ coal} + I_{semi-coke} \times W_{semi-coke}$$

$$W_{semi-coke} = 1 - W_{low-rank\ coal}$$

wherein the low calorific value $Q_{low}$ was determined and calculated according to the international standard ISO1928: 1995 or calculated according to the Mendeleev's empirical formula.

TABLE 9

Cost performance indexes for different proportion schemes

| Proportion of semi-coke/% | Caloric value of mixed coal/ kJ/kcal | Cost of mixed coal/RMB | Combustion rate of mixed coal/% | R |
|---|---|---|---|---|
| 0 | 27893.29 | 550 | 99.67 | 49.67 |
| 20 | 28359.446 | 556 | 99.33 | 49.80 |
| 40 | 28825.602 | 562 | 99.41 | 50.12 |
| 60 | 29291.758 | 568 | 96.89 | 49.12 |
| 80 | 29757.914 | 574 | 95.39 | 48.62 |
| 100 | 30224.07 | 580 | 94.01 | 48.17 |

An interval with larger R was selected as a proportion interval of bituminous coal, specifically as shown in Table 9. In this case, as the proportion of the semi-coke increased, the low calorific value of the mixed fuel gradually increased, the combustion rate gradually decreased, and the cost decreased. Based on the calculation of the cost performance evaluation coefficient, it could be seen that in this case, as the proportion of the semi-coke increased, the cost performance index of the mixed fuel first increased and then decreased. When the proportion of the semi-coke was about 40%, the maximum was reached.

By using the above formula of the cost performance evaluation coefficient as a main determinant of a blending scheme, the combustion performance during blast furnace injection and the purchase cost, pulverizing cost and delivery cost of the injection fuel can be taken into consideration at the same time, and the obtained cost performance evaluation coefficient has high reliability and rationality and has relatively strong guiding significance for an actual blending scheme of the blast furnace injection fuel. By using this cost performance evaluation coefficient, a blending scheme can be obtained quickly and accurately so as to realize the economic maximization and value maximization of the semi-coke in blast furnace injection.

(2) Based on the principle that the content of volatile matters in the injection fuel is less than 25% specified in the national standard, the maximum proportion of the bituminous coal in the mixed fuel was calculated according to the following formula:

$$W_{bituminous\ coal} = \frac{(25\% - V_{semi-coke})}{(V_{bituminous\ coal} - V_{semi-coke})} \times 100\% = 57.27\%$$

in the formula, $W_{bituminouscoal}$ represents a proportion percentage of the low-rank coal, $V_{semi-coke}$ represents a content of volatile matters in the semi-coke, and $V_{bituminouscoal}$ represents a percentage of volatile matters in the low-rank coal.

(3) In proportion intervals of the bituminous coal determined by step (2) and step (3), an explosibility test was sequentially performed on the mixed fuel composed of low-rank coal and semi-coke in proportions corresponding to cost performance evaluation coefficients from high to low, so as to verify whether there was strong or weak explosibility, and when there was no strong explosibility, an optimal blending scheme of the mixed fuel was obtained. Experimental results show that the optimal blending scheme is: 57.27% of bituminous coal+43.73% of semi-coke.

Example 5

An optimization method for efficient use of semi-coke for blast furnace injection used bituminous coal and the semi-coke prepared in Example 2 as a mixed fuel. Other steps are substantially the same as those in Example 4, and are not repeated here.

Experimental results show that the optimal blending scheme is: 59.25% of semi-coke+40.75% of bituminous coal.

Example 6

An optimization method for efficient use of semi-coke for blast furnace injection used bituminous coal and the semi-coke prepared in Example 3 as a mixed fuel. Other steps are substantially the same as those in Example 4, and are not repeated here.

Experimental results show that the optimal blending scheme is: 73.48% of semi-coke++26.52% of bituminous coal.

In conclusion, in the directional preparation technology of semi-coke for blast furnace injection and the optimization method for efficient use of semi-coke for blast furnace injection provided by the disclosure, according to the volatile matter and ash contents of the target semi-coke, the volatile matter removal percentage and the ash removal percentage are obtained, then a plurality of groups of dry distillation and carbonization temperatures and carbonization times are designed, relationships between the carbonization temperature and blast furnace injection performance parameters are established through experiments of a small amount of raw materials, so as to obtain an optimal actual carbonization temperature, and finally, the high-performance semi-coke is obtained through carbonization. According to cost performance evaluation coefficients, based on the principle that the content of volatile matters is less than 25% and there is no strong explosibility, an optimal proportion of semi-coke to low-rank coal can be obtained quickly and accurately. The disclosure expands the application of semi-coke in blast furnace injection, and can realize efficient injection as well as energy saving and emission reduction.

The foregoing descriptions are merely preferable specific implementations of the present invention, but are not intended to limit the protection scope of the present invention. Equivalent replacement or changes made according to the technical solutions and the inventive concept of the present invention by a person skilled in the art within the technical scope disclosed in the present invention shall fall within the protection scope of the present invention.

We claim:

1. A directional preparation technology of semi-coke for blast furnace injection, comprising performing dry distillation on raw coal to remove a portion of a volatile matter to prepare the semi-coke for blast furnace injection, and comprising the following steps:

S11. according to a target value $W_{A_{standard}}$ of an ash percentage of target semi-coke, obtaining a relational expression between an ash removal percentage $W_{A_{removal}}$ in the raw coal and a volatile matter removal percentage $W_{B_{removal}}$ during dry distillation, as shown in Formula (1):

$$W_{A_{removal}} = \frac{W_{A_{coal}} - W_{A_{standard}}(1 - W_{B_{removal}})}{1 - W_{A_{standard}}} \qquad (1)$$

in the formula, $W_{A_{coal}}$ represents a percentage of ash in the raw coal;

the target value of the ash percentage meets $W_{A_{standard}} \leq 12\%$;

S12. according to Formula (1) obtained in step S11, presetting a volatile matter removal percentage during dry distillation, wherein if the preset volatile matter removal percentage $W_{B_{removal}}$ meets Formula (2), the raw coal is first subjected to ash removal treatment before carbonization; if the preset volatile matter removal percentage $W_{B_{removal}}$ does not meet Formula (2), the raw coal is directly subjected to carbonization:

$$W_{B_{removal}} \geq \frac{W_{A_{standard}} - W_{A_{coal}}}{W_{A_{standard}}}; \qquad (2)$$

wherein a method for determining a carbonization temperature of dry distillation comprises: based on the preset volatile matter removal percentage $W_{B_{removal}}$, preliminarily determining a plurality of groups of carbonization temperatures and carbonization times of dry distillation through the pyrolysis behavior of dry distillation charring of the raw coal in a charring furnace, then, according to the plurality of groups of the carbonization temperatures and carbonization times, performing dry distillation and carbonization on the raw coal at different carbonization temperatures and carbonization times to prepare semi-coke, and respectively obtaining relationships between parameters comprising combustion rate, grindability index, explosibility index and jet flow index of the semi-coke and the carbonization temperature;

wherein according to the relationship between the explosibility index and the carbonization temperature, selecting a carbonization temperature with an explosibility index≤200 mm as a lower limit value of the carbonization temperature, and then, in a temperature intervals higher than the lower limit value of the carbonization temperature, according to the relationships between the combustion rate, the grindability index and the jet flow index and the carbonization temperature, selecting a temperature interval in which the combustion rate ≥80%, the grindability index ≥60 and the jet flow index ≥70 as an actual carbonization temperature of dry distillation of the raw coal, and then selecting an actual carbonization time based on the actual carbonization temperature;

S13. if the preset volatile matter removal percentage $W_{B_{removal}}$ meets Formula (2), first subjecting the raw coal to ash removal treatment, then performing dry distillation and carbonization at the actual carbonization time and the actual carbonization temperature determined in step S12, followed by cooling to obtain the semi-coke for blast furnace injection;

if the preset volatile matter removal percentage $W_{B_{removal}}$ does not meet Formula (2), performing dry distillation and carbonization of the raw coal at the actual carbonization temperature and actual carbonization time determined in step S12, followed by cooling to obtain the semi-coke for blast furnace injection.

2. The directional preparation technology of semi-coke for blast furnace injection according to claim 1, wherein in step S11, the target value of the ash percentage meets $W_{A_{standard}} \leq 9\%$.

3. The directional preparation technology of semi-coke for blast furnace injection according to claim 1, wherein in step S12, the method for ash removal treatment is heavy media coal processing technology treatment.

4. The directional preparation technology of semi-coke for blast furnace injection according to claim 1, wherein in step S12, CFD numerical simulation is used to establish a relationship between a heating gas temperature and the carbonization temperature, and then, heating gas temperatures corresponding to different carbonization temperatures are obtained according to the relationship between the heating gas temperature and the carbonization temperature.

5. The directional preparation technology of semi-coke for blast furnace injection according to claim 1, wherein in step S12, the explosibility index is a length of a return flame generated after ignition of the semi-coke determined by a long-tube type coal powder explosibility determining device.

6. The directional preparation technology of semi-coke for blast furnace injection according to claim 1, wherein in step S12, the actual carbonization temperature is 400-600° C.

7. The directional preparation technology of semi-coke for blast furnace injection according to claim 1, wherein in step S15, the cooling comprises adopts a dry quenching process, resulting in semi-coke for blast furnace injection with a full moisture content <5%.

8. The directional preparation technology of semi-coke for blast furnace injection according to claim 1, wherein the directional preparation technology further comprises the following step: pulverizing the semi-coke for blast furnace injection to obtain pulverized semi-coke for blast furnace injection.

9. The directional preparation technology of semi-coke for blast furnace injection according to claim 8, wherein a mass percentage of the pulverized semi-coke for blast furnace injection with a particle size of less than 0.074 mm is not less than 75%.

* * * * *